COLOR TV PHASE COMPARATOR AND FM DETECTOR CIRCUITS UTILIZING VACUUM TUBE INTERMITTENTLY OPERATING IN SECONDARY EMISSION MODE

Filed July 11, 1963 5 Sheets-Sheet 1

PHASE DISCRIMINATOR $e_s$ LAGS $e_{g1}$;
$e_{g1}$ LAGS $e_p$

INVENTOR.
DONALD R. TAYLOR, JR.
BY
Robert D. Sanborn
ATTORNEY $e_{g1}$ IN PHASE WITH $e_s$ $e_{g1}$ IN PHASE WITH $e_p$ ;
$e_s > e_p$ ; $e_p$ LEADS $e_s$ INVENTOR.
DONALD R. TAYLOR, JR.
BY
Robert D. Sanborn
ATTORNEY

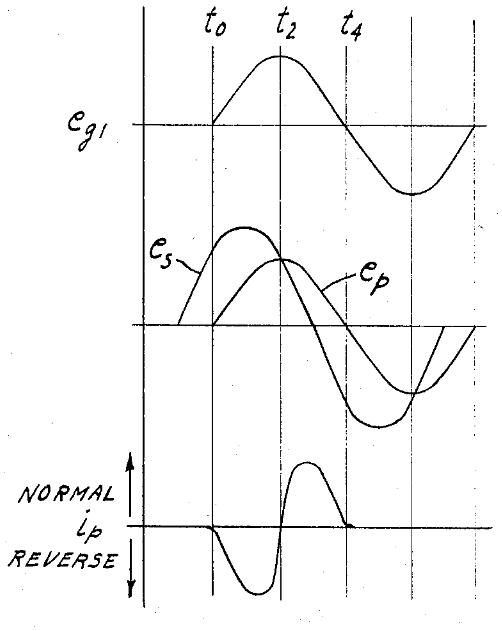
FIG. 2c.
$e_{g1}$ IN PHASE WITH $e_p$ ;
$e_s > e_p$ ; $e_s$ LEADS $e_p$
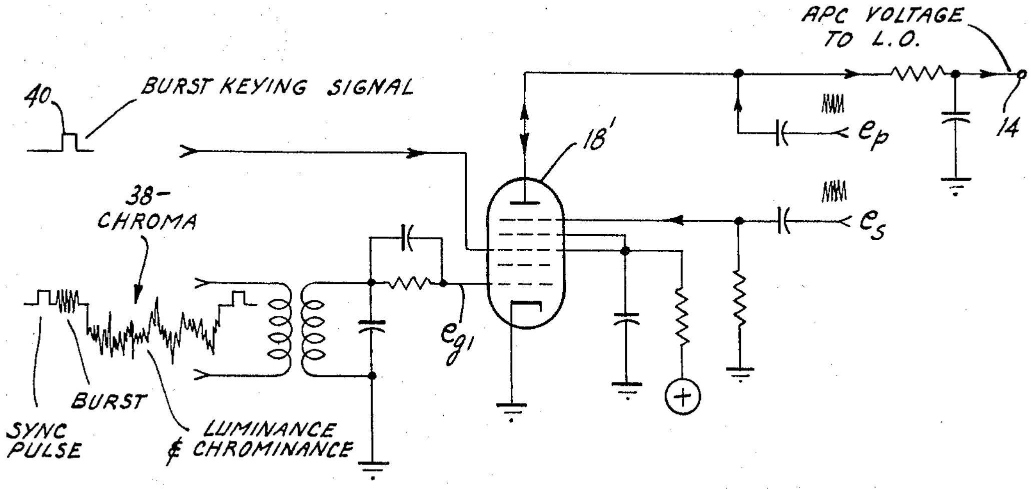
FIG. 3. COMBINED CHROMA REFERENCE DISCRIMINATOR/BURST KEYER
INVENTOR.
DONALD R. TAYLOR, JR.
BY
Robert D. Sanborn
ATTORNEY INVENTOR.
DONALD R. TAYLOR, JR.
BY
Robert D. Sanborn
ATTORNEY ALTERNATE TRANSFORMER CONNECTIONS FOR FIG. 4a.

VICTOR DIAGRAMS OF TRANSFORMER WAVEFORMS $e_p$ IN $\phi$ WITH $e_{g1}$; $\phi e_s$ VARIES INVENTOR.
DONALD R. TAYLOR, JR.
BY
Robert D. Sanborn
ATTORNEY 3,284,565

COLOR TV PHASE COMPARATOR AND FM DETECTOR CIRCUITS UTILIZING VACUUM TUBE INTERMITTENTLY OPERATING IN SECONDARY EMISSION MODE

Donald R. Taylor, Jr., Philadelphia, Pa., assignor to Philco Corporation, Philadelphia, Pa., a corporation of Delaware Filed July 11, 1963, Ser. No. 294,284
5 Claims. (Cl. 178—5.4)

Figure 1A:
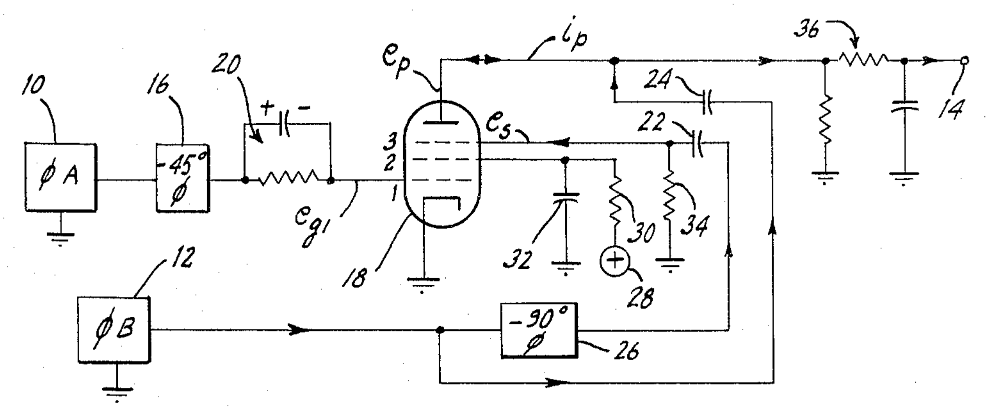

This invention relates to a novel and improved phase discriminator circuit and more particularly to a phase discriminator whose principle of operation includes a vacuum tube current reversal or secondary emission effect of the type first discussed in my previous application, Serial No. 190,114, filed April 25, 1962, entitled Synchronizing Signal Separator Making Use of Forward and Reverse Space Charge Currents, now Patent 3,192,314, granted June 29, 1965 and assigned to the present assignee.

A phase detector or discriminator is a circuit which functions to produce a D.C. output signal whose polarity and magnitude are respectively indicative of the sign and magnitude of the phase difference between plural A.C. input signals. Such discriminators have taken diversified forms and find application in a variety of systems, including control circuitry, television, etc.

The current reversal or secondary emission effect above referred to relates to the principle of operation of multi-grid vacuum tubes wherein a reverse or secondary emission current will flow if the conventional supressor grid is made more positive than the conventional plate when certain other conditions are satisfied. More particularly, a vacuum tube having a control grid, one or more intermediate grids, a last grid, and a plate may be operated in alternate secondary emission and normal conduction modes if the tube is biased into conduction at the first or control grid, a B+ potential is applied to one of the intermediate grids, and respective signals are applied to the last grid and the plate. When the plate is more positive than the last grid, conventional plate current will flow. When the last grid is the more positive, reverse or secondary emission current will flow in the plate. The presence and magnitude of the normal and reverse plate currents may be respectively controlled by the presence and magnitude of the signal at the first grid.

If the signals on the first grid, last grid and plate are arranged so that the normal and reverse plate currents average to zero at a reference phase relationship between two of the signals, then at other phase relationships an unbalanced alternating current, indicative of the sign and magnitude of the phase relationship, will flow. If the signal-frequency components are filtered from this net plate current, a bipolar phase-indicative signal may be obtained.

In addition to a basic phase discriminator utilizing this secondary emission effect, several exemplary ramifications thereof will be described. A color TV chroma reference discriminator or combined burst keyer-chroma reference discriminator may be easily and simply provided utilizing the principles of the invention. Also a novel combined FM limiter-discriminator will be shown and discussed.

OBJECTS

Accordingly the objects of the present invention are:

(1) To provide a novel and improved phase discriminator, (2) To provide a novel mode of operation of multi-grid vacuum tubes, (3) To provide new and improved chroma reference discriminator circuits, and (4) To provide a new FM limiter-discriminator circuit.

Other objects and advantages of the invention will become apparent from a consideration of the following description thereof and accompanying drawings.

SUMMARY

According to one embodiment of the present invention two A.C. signals are applied to the circuit of the invention for phase comparison and a third, phase-indicative, signal is obtained at the output of said circuit. One of the A.C. signals is utilized to turn on a multi-grid tube on positive half cycle intervals thereof. Two versions of the other of the A.C. signals are applied to the plate and last grid, respectively, of the tube at phase angles such that normal and secondary emission currents alternately flow in the plate circuit. These currents average to zero when the two original A.C. signals are in phase. The phase indicative signal is recovered, via a filter, from the alternating current in the plate of the tube.

DRAWINGS

Figure 1B:
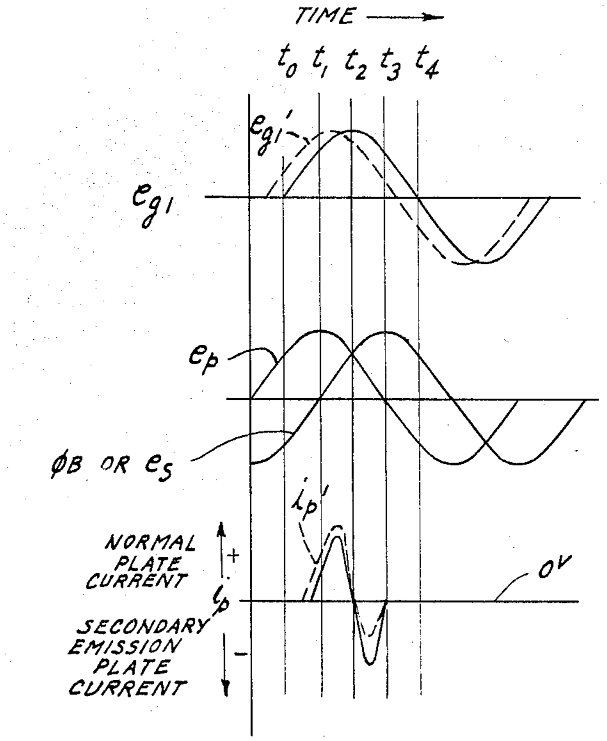
Figure 2A:
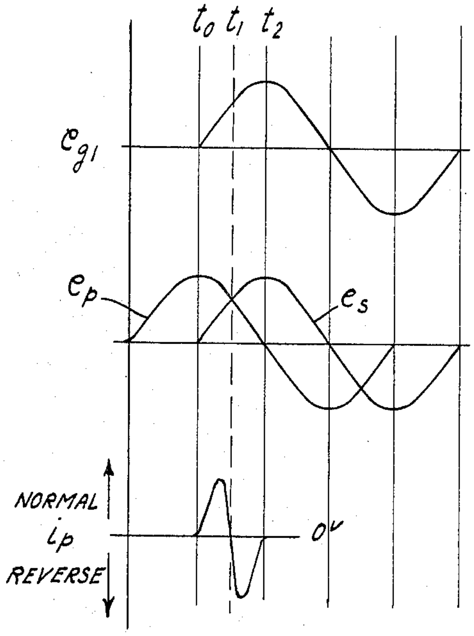
Figure 2B:
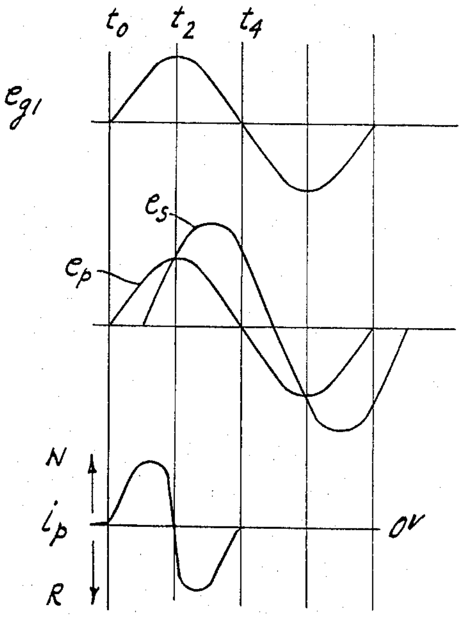
Figure 4A:
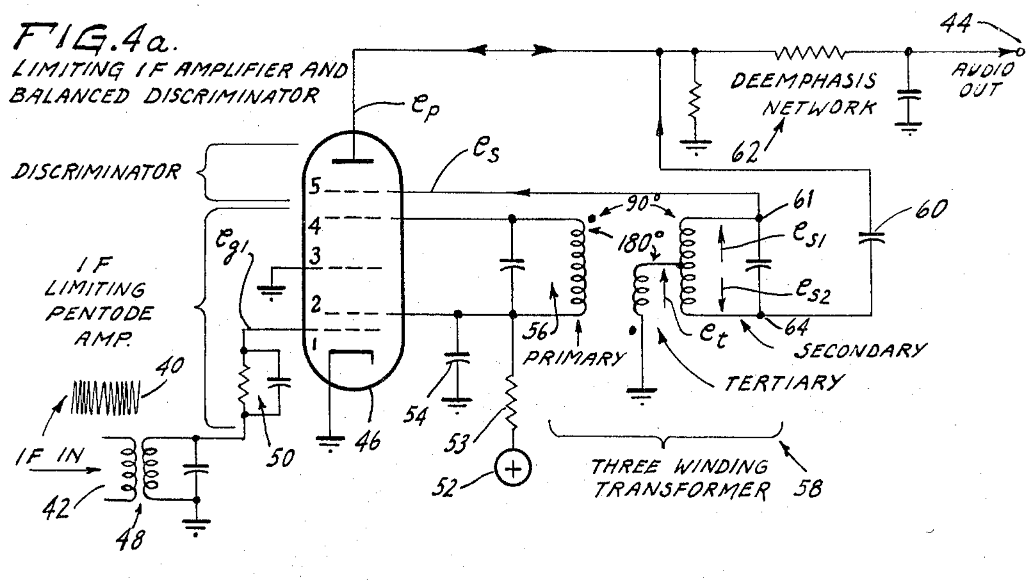
Figure 4C:
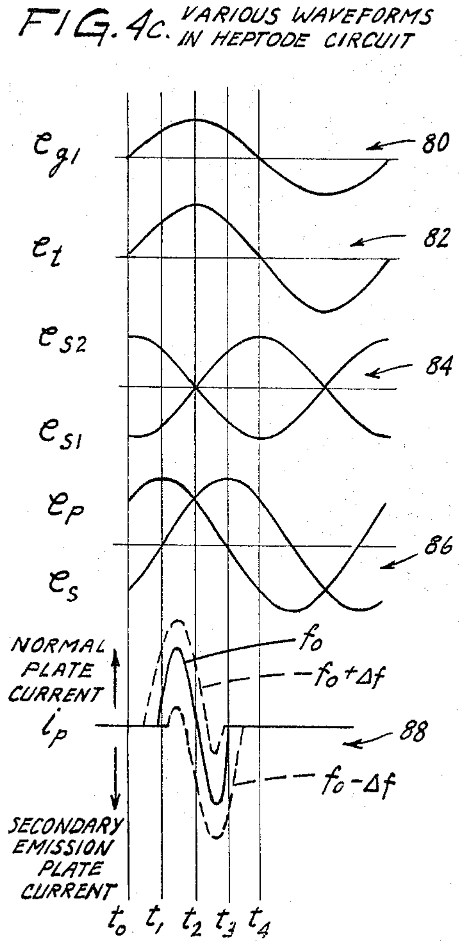
Figure 4B:
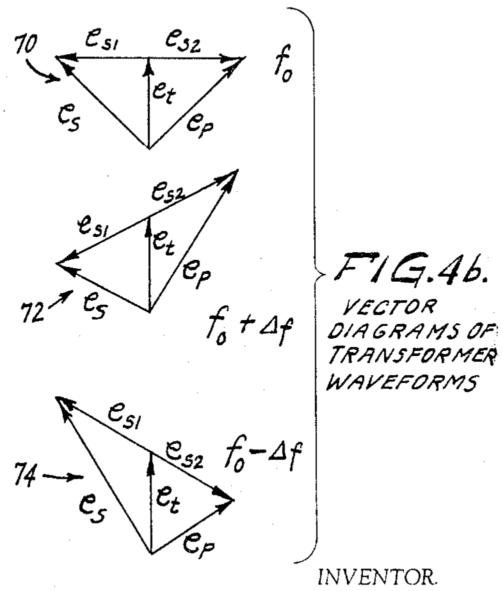
Figure 5A:
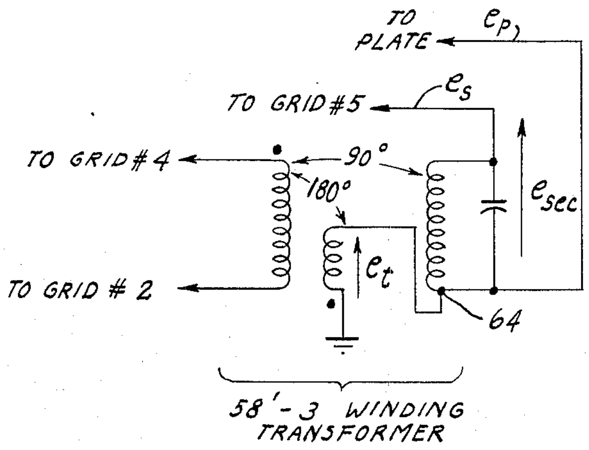
Figure 5B:
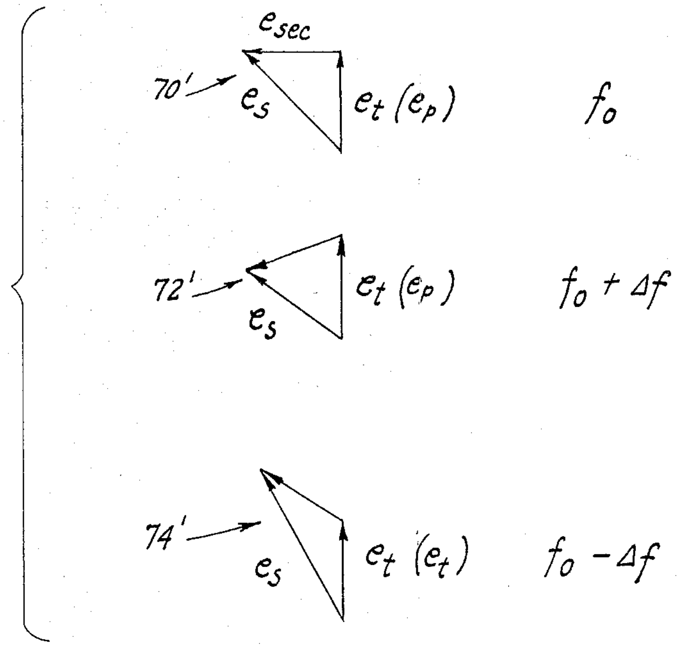

FIG. 1*a* shows a basic phase discriminator circuit according to the invention;

FIG. 1*b* is a diagram of waveforms found in the circuit of FIG. 1*a*;

FIGS. 2*a*, 2*b*, and 2*c* show diagrams of waveforms found in modifications of the circuit of FIG. 1*a*;

FIG. 3 shows a chroma reference-discriminator burst-keyer according to the invention;

FIG. 4*a* shows a schematic diagram of a FM limiter-discriminator according to the invention;

FIGS. 4*b* and 4*c* show diagrams of waveforms and waveform vectors found in the circuit of FIG. 4*a*;

FIG. 5*a* shows a schematic diagram of a modification of the circuit of FIG. 4*a*; and FIG. 5*b* shows diagrams of voltage vectors found in the circuit of FIG. 5*a*.

FIG. 1*a*—PHASE DISCRIMINATOR

*Description*

The circuit depicted in FIG. 1*a* is a basic circuit of the invention which compares the signals generated by sources 10 and 12 to produce a voltage at output 14 whose polarity indicates whether the signal from source 12 (arbitrarily designated $\phi$B signal) leads or lags the signal from source 10 (arbitrarily designated $\phi$A signal), and whose magnitude indicates the degree of phase difference between the $\phi$A and $\phi$B signals.

The $\phi$A signal is retarded in phase by 45° in phase shifter 16 and is applied to grid #1 of pentode 18 via RC circuit 20. One cycle of the resultant signal appearing on the first grid of pentode 18 is depicted as waveform $e_{g1}$ in FIG. 1*b*. The $\phi$A signal from source 10 (not shown) is substantially identical to signal $e_{g1}$, except that its phase position is 45° ahead of $e_{g1}$. RC circuit 20 is a familiar self-bias circuit which is arranged to bias pentode 18 so that only the positive portion of signal $e_{g1}$ turns pentode 18 on. Other methods of biasing pentode 18 to secure a similar result, which are well known to the skilled artisan, may be used in lieu of RC circuit 20.

The $\phi$B signal is applied to grid #3 (the suppressor) of pentode 18 via 90° phase shifter 26 and capacitor 22, and to the plate of pentode 18 via capacitor 24. Although the suppressor and plate of pentode 18 do not perform their conventional functions in the circuit of FIG. 1*a*, these names will be retained and the signals present on these elements will be respectively designated $e_s$ and $e_p$. One cycle of each of these signals is depicted in FIG. 1*b* on the same time scale as signal $e_{g1}$, but on a separate time axis. It may be noted that signal $e_s$ is 45° behind $e_{g1}$, and signal $e_p$, which is identical to signal $\phi$B from source 12, is 45° ahead of signal $e_{g1}$.

Bias voltage source 28 is connected to grid #2 of pentode 18 via resistor 30. A bypass capacitor 32 is connected between grid #2 and ground. Grid #3 is connected to ground via resistor 34. The plate of pentode 18 is connected to output terminal 14 via filter 36.

*Operation*

When signals $\phi$A and $\phi$B are in phase, the signals $e_p$, $e_s$, and $e_{g1}$ will have phases as represented by the curves in FIG. 1*b*. During part of the interval from time $t_0$ to time $t_2$, when plate voltage $e_p$ is more positive than grid #3 voltage $e_s$, normal plate current, represented by the positive portion of curve $i_p$, will flow. After $e_s$ becomes greater than $e_p$ at time $t_2$, grid #3 will collect electrons from the plate and a reverse or secondary emission plate current, represented by the negative portion of curve $i_p$, will flow. The area under the positive portion of curve $i_p$ should be equal to the area included within the negative portion so that no net plate current will flow when signals $\phi$A and $\phi$B are in phase. Filter 36 removes the signal frequency component of the signal appearing on the plate, leaving only the phase indicative component to be applied to output terminal 14. Since the $\phi$A and $\phi$B signals are in phase, waveform $i_p$ has no D.C. component; thus no voltage will appear at terminal 14.

Due to inherent asymmetries in the system, a D.C. voltage may appear at terminal 14 when phase coincidence does exist. This can easily be remedied by decreasing or increasing the amplitude of one of the signal sources, or by increasing or decreasing the phase shift produced by one of the phase shifters. For instance, if at phase coincidence, a positive voltage appears at point 14, this indicates the positive portion of the current represented by waveform $i_p$ is greater than the negative portion thereof. This can be remedied if one or more of the following be done: the alternating signal $e_p$ supplied to the plate may be decreased in amplitude, the amplitude of the signal $e_s$ may be increased, the signal $e_p$ may be retarded more than 90°, or the signal may be retarded less than 45°.

Assuming that the circuit is properly adjusted, the operation when signal $\phi$A is not in phase with signal $\phi$B will now be described. Assume that signal $\phi$A leads signal $\phi$B. Waveform $e_{g1}$ will be shifted to the left in relation to waveforms $e_p$ and $e_s$ as shown by the broken line $e_{g1}'$ and the conducting or "on" intervals of tube 18 will be similarly advanced in time. The left or positive portion of waveform $i_p$ will be increased while the negative portion thereof will be decreased as shown by the broken line $i_p'$; thus a net positive D.C. voltage will appear at point 14. If signal $\phi$A lags $\phi$B, a negative D.C. voltage will appear at point 14. The magnitude of the D.C. voltage, whether positive or negative, will be proportional to the magnitude of phase difference between signals $\phi$A and $\phi$B.

In FIG. 1*b*, signal $e_{g1}$ has been shown for purposes of illustration as equal in size to signals $e_p$ and $e_s$; however in practice $e_{g1}$, a grid signal, will normally be much smaller than the plate and suppressor signals. Moreover signals $e_s$ and $e_p$ have been shown as equal in amplitude, with signals $e_s$ and $e_p$ respectively 45° behind and 45° ahead of signal $e_{g1}$. It will be apparent to those skilled in the art that the invention is not limited to these specific interrelationships between signals $e_{g1}$, $e_s$, and $e_p$. Furthermore the signals are not limited to the sinusoidal shapes shown in the drawings; any shape repetitive waveform may be used in accordance with the invention. The only requirement necessary for operability is that the phase, amplitudes, and shapes of the signals applied to the tube be selected so that the forward (normal) and reverse (secondary emission) plate currents average to zero when the two input signals to be compared are in phase coincidence.

It is also seen in FIG. 1*a* that one of the 2 input signals ($\phi$B) is "split" into two versions which are applied to the plate and suppressor, respectively. The signal which is "split," may be either one of the two input signals, i.e., it is immaterial whether the signal which is split is a standard phase signal or the signal of variable phase. Furthermore it is immaterial to which two of the three tube elements (plate, suppressor, and grid #1) the two versions of the input signal which is "split" are applied, so long as the phases, amplitudes, and shapes of the applied signals are adjusted so that the normal and reverse plate currents average to zero when the two input signals are at phase coincidence.

Several exemplary modifications of the conditions existing in FIGS. 1*a* and *b* will now be discussed to illustrate the foregoing principles.

FIGS. 2*a*, *b*, *c*—PHASE DISCRIMINATOR MODIFICATIONS

*FIG. 2a—$e_{g1}$ in phase with $e_s$*

In FIGS. 1*a* and *b*, signals $e_p$ and $e_s$ were illustrated as equally displaced in phase (by 45°) from signal $e_{g1}$. If signal $e_s$ is arranged to be closer in phase than 45° from signal $e_{g1}$, a concomitant shift of signal $e_p$ away from $e_{g1}$ by more than 45° will still enable the normal and reverse plate currents to average to zero. This is depicted in FIG. 2*a*, where for purposes of simplification, signal $e_s$ is illustrated as in phase with signal $e_{g1}$ and signal $e_p$ as 90° ahead of signal $e_{g1}$, although similar results will follow if signals $e_s$ and $e_p$ are made to respectively and proportionally lead signal $e_{g1}$ by anywhere from 0° to 45° and lag by anywhere from 45° to 90°. Plate current will flow under the phase conditions illustrated in the FIG. 2*a* substantially only from times $t_0$ to $t_2$, since this interval is the only time that both signals $e_{g1}$ and $e_p$ are greater than cutoff and cathode potential, respectively, a condition essential for plate current flow. As shown, normal plate current will flow when signal $e_p$ is greater than signal $e_s$, (times $t_0$ to $t_1$), and reverse or secondary emission current will flow when signal $e_s$ is greater than signal $e_p$ (times $t_1$ to $t_2$).

The phase relationships depicted in FIG. 2*a* may be easily achieved for example, by applying input signal $\phi$A to grid #1, applying input signal $\phi$B to the suppressor, and applying a 90° delayed version of either signal $\phi$A or $\phi$B to the plate. It should be noted that in FIG. 2*a* as in FIG. 1*b*, signals $e_p$ and $e_s$ are again shown as having equal amplitudes for convenience.

*FIG. 2b—$e_{g1}$ in phase with $e_p$; $e_p < e_s$; $e_p$ leads $e_s$*

If the signal $e_p$ is brought closer to or into phase with signal $e_{g1}$, then signal $e_s$ may be increased in amplitude in order to enable the normal and reverse plate currents to average to zero. In FIG. 2*b*, for purposes of simplification, signals $e_{g1}$ and $e_p$ are illustrated as in phase, and signal $e_s$ as lagging by 45°. Many obvious ways of shifting the phase and altering the amplitude of the two input signals, $\phi$A and $\phi$B, to produce the conditions shown are available and will not be discussed. The normal and reverse plate currents will average to zero from times $t_0$ to $t_4$ as shown.

*FIG. 2c—$e_{g1}$ in phase with $e_p$; $e_s > e_p$; $e_s$ leads $e_p$*

In FIG. 2*c* the same amplitude and phase relationships as in FIG. 2*b* are maintained with the exception that signal $e_s$ leads signals $e_{g1}$ and $e_p$ by 45°. Under these conditions the normal and reverse plate currents $i_p$ can again be made to average to zero; it will be observed however, that the reverse plate current interval precedes the normal plate current interval in this embodiment.

Many other variations of the phase position and amplitude of the three signals, $e_{g1}$, $e_s$, and $e_p$ which will allow current $i_p$ to average to zero when the input signals are in phase coincidence will be apparent to those skilled in the art and no further examples will be discussed. Accordingly the scope of invention is not limited to the foregoing examples.

CHROMA REFERENCE DISCRIMINATOR APPLICATION

Since the apparatus of the invention provides a phase discriminator in a simple fashion substantially within a single tube structure, it may advantageously be used as a color TV chroma reference discriminator, wherein the phase of the incoming reference bursts is intermittently compared with the phase of the signal from a reference oscillator to produce an automatic phase control voltage which maintains the phase of the reference oscillator signal identical to that of the incoming bursts. Referring back to FIG. 1*a*, if source 10 represents the source of incoming bursts and source 12 the reference oscillator, the desired APC voltage will be supplied to point 14. The three signals, $e_{g1}$, $e_s$, and $e_p$, may be derived in any manner from the incoming burst and reference oscillator signal as afore-discussed; the phases and amplitudes of the signals $e_{g1}$, $e_s$, and $e_p$ must, of course, be arranged so that no net plate current flows when the bursts and the reference oscillator have like phase. The signal $e_{g1}$ which is applied to grid #1 should be derived from the bursts so that the pentode 18 will be conducting only when bursts are present; otherwise an APC voltage might be produced when no bursts are being compared with the reference oscillator signal.

FIG. 3—CHROMA REFERENCE DISCRIMINATOR BURST KEYER

The circuit of FIG. 3 illustrates a combined chroma reference discriminator/burst-keyer utilizing the phase discriminator of FIG. 1*a*. Because the phase discriminator of the invention is inherently simple in requiring only three tube elements, an additional function can be performed in the same tube structure if a multi-grid tube is utilized. In FIG. 3 the complete chroma signal 38 is applied to the control grid of heptode 18'. To the third grid is supplied a conventional burst keying signal 40 in phase with the bursts in signal 38. Heptode 18' can conduct only when burst keying signal 40 is present; thus a time selection function will be performed on signal 38 so that the space current of tube 18 will conform only to the bursts in signal 38. Signals $e_p$ and $e_s$, one or both of which are derived from a local oscillator (L.O.), are applied to the plate and suppressor at such phase and amplitude that the plate current will average to zero when the bursts and the local oscillator signal are in phase. When the bursts and the L.O. signal are out of phase a D.C. signal will appear at point 14 which may be employed as an automatic phase control (APC) voltage to correct the phase of the L.O. signal in conventional fashion.

FIG. 4—LIMITER/FM DISCRIMINATOR

*Description*

The circuit of FIG. 4*a* shows a single tube combined IF limiter amplifier/FM discriminator utilizing the phase discriminator of the invention. Any FM-modulated signal 40 may be applied at input 42, and the modulation signal, which is usually of audio frequency, is obtained at output 44.

The circuit utilizes a heptode having 5 grids, $g_1$ to $g_5$. Any FM-modulated carrier, represented in FIG. 4*a* as signal 40, is applied to input 42, the primary of tuned transformer circuit 48. The secondary of tuned transformer circuit 48 is coupled to grid #1 of tube 46 via RC bias circuit 50. A fixed bias supply voltage 52 is coupled, via resistor 53, to grid #2. Grid #2 function as a screen grid. Resistor 53 is bypassed by capacitor 54. Grid #3, which functions as a suppressor, is grounded, and grid #4, which functions as a plate, is coupled to one terminal of the tuned primary winding 56 of three winding transformer 58. The other terminal of the primary winding 56 is connected to bias source 52 via resistor 53.

Transformer 58 has primary, secondary, and tertiary windings, as indicated. The transformer may be similar to those constructed for normal 4.5 mc. discriminators or ratio detectors, and is shown, for example, on pp. 12–36 of the Radio Engineering Handbook by Henney (5th ed. 1959). One side of the tertiary winding is grounded (or returned to a bias potential) and the other is center-tapped to the secondary winding. The secondary winding, like the primary, is tuned with a shunt capacitor. One side of the secondary winding is coupled to the plate of tube 46 via capacitor 60, while the other side is connected to grid #5 of tube 46. Grid #5 (which usually functions as a suppressor), and the plate, correspond in functional application to the last grid and plate of tubes 18 and 18' in FIGS. 1*a* and 3, respectively.

The plate of heptode 46 is connected to one side of a conventional FM deemphasis and filter network 62. The other side of deemphasis network 62 is connected to output terminal 44.

*Operation*

The operation of the circuit of FIG. 4*a* may be most easily understood if it is first noted that three functions are performed therein: the cathode and first four grids of tube 46 function as a limiting amplifier; the transformer circuitry functions as a frequency-to-phase converter; and the fifth grid and plate circuit function as a phase comparator. These three functions will be separately discussed.

(1) LIMITING AMPLIFIER

The cathode and first four grids of heptode 46 are analogous to an ordinary pentode, with grid #4 acting as a plate. IF carrier signal 40 is applied to tuned transformer circuit 48 at a level such that sufficient limiting will occur to eliminate noise pulses therefrom in conventional manner; the amplified and limited IF carrier signal will appear across tuned primary circuit 56 of transformer 58.

(2) TRANSFORMER FREQUENCY-TO-PHASE CONVERTER

Reference will be made to the vector diagrams of the transformer waveforms in FIG. 4*b* to explain the principle of operation of three winding transformer 58.

It is known that the voltage across the secondary winding of a tuned transformer will be in quadrature with the primary voltage when the frequency of the latter is at resonance, i.e., equal to the frequency of the tuned transformer. When the frequency of the primary voltage deviates from the resonance value, the phase of the secondary voltage will deviate from that of the primary as a linear function of such frequency deviation. This principle is discussed further in Modulation Theory, by Black (1953).

Thus the phase of the voltage across the entire secondary winding of transformer 58 will be 90° behind the phase of the voltage across the primary winding when the incoming IF carrier is unmodulated and hence is at center frequency, $f_0$. When the carrier is modulated, its frequency will alternately increase to a frequency ($f_0+\Delta f$) and decrease to a frequency ($f_0-\Delta f$), causing the phase of the secondary voltage to alternately advance and retard from its normal (carrier unmodulated) 90° relationship. The tertiary untuned winding of transformer 58 is physically connected so that the voltage thereacross, $e_t$ will be substantially 180° out of phase with the primary voltage at all times.

The output voltages from transformer 58, $e_s$ and $e_p$, are derived from terminals 61 and 64 on either side of the secondary winding. Voltage $e_s$, which is applied to grid #5, represents the vectorial sum of the tertiary voltage $e_t$ and one half of the secondary winding voltage $e_{s1}$, measured from the centertap of the secondary winding to point 61. Voltage $e_p$, which is applied to the plate, represents the vectorial sum of $e_t$ and the other half of the secondary winding voltage, $e_{s2}$, measured from the centertap of the secondary winding to point 64.

Vector diagram 70 in FIG. 4*b*, depicts the voltage on transformer 58 when the incoming IF carrier is at frequency $f_0$ (unmodulated). Vector $e_t$ will be 180° out of phase with the primary voltage (not shown). Vectors $e_{s1}$ and $e_{s2}$ will be respectively 90° ahead of and 90° behind vector $e_t$ at center frequency. The vectorial sum of vectors $e_t$ and $e_{s1}$ will be vector $e_s$, and vector $e_p$ will be the vectorial sum of $e_t$ and $e_{s2}$. It should be noted that vectors $e_s$ and $e_p$ are in quadrature and of equal length.

Vector diagram 72 depicts the transformer waveform when the incoming IF carrier modulated and above center frequency, i.e., at a frequency $(f_0+\Delta f)$. Vectors $e_{s1}$ and $e_{s2}$ will be shifted ahead causing vectors $e_s$ and $e_p$ to become unequal in length, with vector $e_p$ greater than $e_s$. Vectors $e_s$ and $e_p$ will remain in quadrature as shown if $e_{s1}$ and $e_{s2}$ are equal. Such a relationship may not exist in practice due to inherent asymmetries in the system.

Vector diagram 74 depicts the transformer waveforms when the frequency of the IF carrier is at a frequency below center frequency, i.e., at frequency $(f_0-\Delta f)$. Here vectors $e_s$ and $e_p$ will be retarded, with vector $e_s$ greater than $e_p$.

The actual waveforms of the voltages in the circuit of FIG. 4*a* are depicted in FIG. 4*c*. It will be noted that voltages $e_{g1}$ and $e_t$ are substantially in phase over the frequency range considered. The alternating voltages $e_p$ and $e_s$ applied to the plate and grid #5, respectively, of tube 46 will be symmetrically phase displaced from voltage $e_{g1}$ at frequency $f_0$, with $e_s$ and $e_p$ in quadrature and of equal magnitude. When the frequency of the IF carrier is above or below $f_0$, voltages $e_p$ and $e_s$ will be unequal in magnitude and unequally displaced in phase with respect to voltage $e_{g1}$ due to the transformer action aforediscussed.

(3) PHASE COMPARATOR

Grid #5 and the plate of heptode 46 function as a phase comparator which converts the phase-amplitude variations in signals $e_s$ and $e_p$ into a signal representative of the modulation component of signal 40. The rate of the phase-amplitude variations in signals $e_s$ and $e_p$ will be proportional to the frequency of the modulating signal, while the magnitude of the phase-amplitude variations will be proportional to the amplitude of the modulating signal.

More particularly, it can be seen in FIG. 4*c* that waveforms $e_s$ and $e_p$ are symmetrical about the vertical "$t_2$" line from times $t_0$ to $t_4$, when $e_{g1}$ is positive. If the input signal is at frequency $f_0$ during the approximate interval from $t_1$ to $t_2$, when voltage $e_p$ is greater than $e_s$, normal plate current will flow as shown by the solid line $f_0$ in waveform $i_p$. From the approximate interval from time $t_2$ to $t_3$, secondary emission plate current will flow as also represented by solid line $f_0$. Since $e_p$ and $e_s$ are equal and symmetrically phase related to $e_{g1}$ when the IF carrier is at center frequency $f_0$, the plate current $i_p$ will average to zero. As shown in vector diagram 72 in FIG. 4*b*, when the frequency of the IF is above $f_0$, i.e., at a frequency $(f_0+\Delta f)$, $e_s$ and $e_p$ will be advanced in phase position with respect to $e_t$ (and $e_{g1}$) and magnitude of $e_p$ will increase while $e_s$ will decrease. This will cause the forward part of plate current $i_p$ to predominate over the secondary emission part thereof as shown by the dashed line $f_0+\Delta f$ in waveform $i_p$ in FIG. 4*c*. Similarly when the frequency of the IF carrier is below center frequency, i.e., at a frequency $(f_0-\Delta f)$ the secondary emission part of plate current $i_p$ will predominate as will be evident from an inspection of vector diagram 74 in FIG. 4*b* and dashed line $f_0-\Delta f$ in waveform $i_p$.

When the IF signal is modulated, its frequency will alternately vary above and below center frequency $f_0$. The normal and secondary emission components of the plate current $i_p$ will alternately predominate in conformance to the frequency variations in the IF carrier, and the resulting net component of the plate current will have the same form as the original modulating signal.

Deemphasis network 62 restores the signal components in the original modulating signal to their proper relationship in well-understood manner and also removes the signal frequency components of the IF carrier from the plate circuit. The modulating signal, which in most cases will be of audio frequency, will appear at output terminal 44.

The output of the limiter-discriminator of FIG. 4*a* is inherently balanced since direct current will never appear on the plate so long as the frequency of the IF signal applied at input 42 is equal to that to which transformer 58 is tuned.

If the frequency of the IF signal should drift, a direct current will appear on the plate. Thus the audio output at point 44 may be used for automatic frequency control (AFC) purposes if desired by first filtering it to remove the audio components and then using the resultant D.C. error signal to control the frequency of the local oscillator.

FIGS. 5*a* AND *b*—MODIFICATION OF LIMITER-DISCRIMINATOR

It will be apparent that signals $e_s$ and $e_p$ do not have to be at the particular phase relationship shown in FIGS. 4*b* and *c* when they are applied to the plate and suppressor of tube 46. For instance the phase relationships shown in FIG. 2*b*, where $e_p$ and $e_{g1}$ are in phase and $e_s$ lags $e_p$, may be utilized in conjunction with the circuit of FIG. 4*a* if transformer 58 is modified as shown in FIG. 5*a*.

In FIG. 5*a* the ungrounded end of the tertiary winding of transformer 58' is connected to point 64 and the primary-tertiary ratio is made identical to the primary-secondary ratio; otherwise transformer 58' and its connections are identical to transformer 58 and its connections in FIG. 4*a*. In FIG. 5*a* voltage $e_s$ is equal to the vectorial sum of the voltage $e_t$ on the tertiary winding, and the voltage $e_{sec}$ on the secondary winding. Voltage $e_p$ is obtained at point 64 and is equal to $e_t$, the tertiary voltage. Voltage $e_p$ will not vary appreciably in phase as the frequency of the IF carrier changes, but will have substantially the same phase as voltage $e_{g1}$ except at the outer edges of the transformer primary response curve which is beyond the range of interest. Voltage $e_s$, however, will vary in phase as the carrier frequency changes as is illustrated in FIG. 5*b*.

Vector diagram 70' illustrates the various transformer voltages at center frequency $f_0$. Voltage $e_{sec}$ is at 90° from both the primary voltage (not shown) and its inversion, $e_t$, when the frequency of the IF carrier and the frequency of the tuned transformer secondary are equal. Voltage $e_s$, the vectorial sum of $e_t$ and $e_{sec}$, will lead $e_t$ by about 45°. When the frequency of the IF carrier is above $f_0$, i.e., at a frequency $(f_0+\Delta f)$, $e_s$ will advance in phase and decrease in magnitude as shown in vector diagram 72'. When the frequency of the IF carrier is below $f_0$, i.e., at a frequency $(f_0-\Delta f)$, $e_s$ will be retarded in phase and increase in magnitude as shown in vector diagram 74'. The operation of the phase discriminator part of the circuit for these relationships is discussed in conjunction with FIG. 2*b*. Various other operable phase and/or amplitude relationships between signals $e_g$, $e_p$, and $e_s$ (including those of FIGS. 2*a* and 2*c*), will occur to those skilled in the art. Concomitant modifications of transformer 58 will be, of course, required, yet these will be similarly obvious to those skilled in the art and hence fall within the scope of the invention.

The instant invention is not limited to the specificities of the foregoing description since many modifications thereof which still fall within the true scope of the inventive concept will be apparent to those conversant with the art. The invention is defined only by the appended claims.

I claim:

1. A phase comparator for a color television receiver for producing a bipolar phase-error indicative signal for controlling a color reference oscillator, comprising:

(a) an electron tube having a cathode, at least three grids including a control grid, a second grid, a third grid, and a plate, said third grid being the one closest to said plate, (b) means connecting said cathode to a point at reference potential, (c) means for supplying a positive bias potential to said second grid, (d) means for supplying color reference bursts from the composite color television video signal in said receiver across said control grid and said cathode such that space current flows in said tube to said cathode for intermittent intervals during the duration of each applied burst, (e) means for deriving from the output signal of the color reference oscillator in said color television receiver two dissimilarly phased alternating current signals of the same frequency as said output signal, (f) means for supplying said alternating current signals to said plate and said third grid, respectively, said alternating current signals being phase such that if said output signal and said color reference bursts have like phase, during one part of each said interval when space current flows said third grid will be more positive than said plate, and during another part of each said interval said plate will be more positive than third grid, and (g) alternating curernt filter means connected to said plate, for passing, a bipolar phase-error indicative output signal from said comparator while suppressing the burst-frequency component of the signal at said plate.

2. The comparator of claim 1 wherein said electron tube includes a fourth grid interposed between said second grid and said control grid, said means of clause (d) is arranged to supply said composite color television video signal, including said color reference bursts, across said control grid and said cathode, and wherein said comparator further includes means for supplying a burst keying signal to said fourth grid so as to enable said tube to conduct only during intervals when said color bursts are present, whereby said phase comparator will also function as a burst keyer.

3. A frequency modulation detector comprising:

(a) a vacuum tube having a cathode, at least three grids, and a plate, (b) means connecting said cathode to a point at reference potential, (c) means for impressing a carrier signal which is frequency modulated by an intelligence signal on a first of said grids, (d) means for deriving said carrier signal from a second of said grids in amplified form, (e) means for deriving from said amplified carrier signal two further signals of like frequency as said carrier signal but of dissimilar phase, (f) means for impressing one of said two further signals on a third of said grids and for impressing the other of said two further signals on said plate, said two further signals having phases such that said third grid will alternately be more positive than said plate at the frequency of said carrier, and (g) filter means for deriving said intelligence signal from said plate while suppressing the carrier frequency component of the signal at said plate.

4. A frequency modulation detector comprising:

(a) a vacuum tube having at least four grids, a plate, and a cathode connected to reference potential, (b) means for supplying to a first of said grids a carrier signal which is frequency modulated by an intelligence signal, (c) a transformer having a primary winding connected between a second and a third of said grids, said primary winding also being connected to a biasing source, whereby an amplified version of said carrier signal will be supplied across said primary winding, (d) said transformer having a tuned secondary winding inductively coupled to said primary winding for developing oppositely-phased versions of said carrier signal, (e) means for supplying a reference signal having a phase in quadrature with said oppositely-phased versions of said carrier signal, (f) means for adding said reference signal and one of said oppositely-phase signals and for supplying the resultant sum signal to the plate of said vacuum tube, and for adding said reference signal and the other of said oppositely-phase signals and for supplying the resultant sum signal to a fourth of said grids so as to cause normal and secondary emission currents to flow alternately to and from said plate, and (g) filter means for passing said intelligence signal from said plate while suppressing the carrier frequency component of the signal at said plate.

5. An intermediate frequency limiting amplifier and frequency modulation detector comprising, in combination:

(a) a heptode having a cathode, plate, and 5 grids, consecutively numbered from cathode to plate, (b) a source of frequency modulated intermediate frequency carrier signal connected between grid #1 and said cathode, (c) means connecting grid #3 to a source of reference potential, (d) a 3-winding transformer having primary, secondary, and tertiary windings, said secondary winding being tuned to said intermediate frequency, said primary winding being connected between grid #2 and grid #4, said tertiary winding being connected between ground and a centertap on said secondary winding, and said secondary winding being connected between grid #5 and said plate, and (e) an output terminal also connected to said plate for deriving a demodulated output signal therefrom.

References Cited by the Examiner

UNITED STATES PATENTS

| | | | |
|---|---|---|---|
| 2,585,532 | 2/1952 | Briggs | 329—137 |
| 3,028,559 | 4/1962 | Spacklen | 329—138 X |
| 3,192,314 | 6/1965 | Taylor | 178—5.8 |

DAVID G. REDINBAUGH, *Primary Examiner.*

J. H. SCOTT, *Assistant Examiner.*